United States Patent [19]

Skinner et al.

[11] Patent Number: 4,714,225

[45] Date of Patent: Dec. 22, 1987

[54] FOUNDATION SYSTEM FOR GROUND-MOUNTED MASTS

[76] Inventors: Jerald P. Skinner, 3014 Eveningside Dr., Topeka, Kans. 66614; Richard A. Zlotky, 246 Yorkshire, Topeka, Kans. 66606; Robert L. Diel, 2537 Michigan, Topeka, Kans. 66605

[21] Appl. No.: 905,509

[22] Filed: Sep. 9, 1986

Related U.S. Application Data

[63] Continuation-in-part of Ser. No. 751,622, Jul. 2, 1985, abandoned.

[51] Int. Cl.[4] .............................................. F16M 13/00

[52] U.S. Cl. ..................................... 248/523; 248/529; 248/533; 248/678

[58] Field of Search ............... 248/523, 524, 529, 530, 248/533, 545, 156, 121, 122, 678, 676, 679, 230; 403/175, 178, 217; 52/296, 297, 298

[56] References Cited

U.S. PATENT DOCUMENTS

| | | | |
|---|---|---|---|
| 1,151,745 | 8/1915 | Wagner | 248/524 |
| 1,302,652 | 5/1919 | Gilbert | 403/217 X |
| 1,689,050 | 10/1928 | Rawley | 52/298 X |
| 1,722,352 | 7/1929 | Rawley | 52/298 X |
| 2,692,745 | 10/1954 | Barrett | 248/230 X |
| 2,907,544 | 10/1959 | Harling | 248/230 X |
| 3,752,476 | 8/1973 | Mahoney | 248/156 X |
| 4,448,313 | 5/1984 | Pomeroy et al. | 248/230 X |
| 4,454,515 | 6/1984 | Major et al. | 248/122 X |

OTHER PUBLICATIONS

Earthbound, one-sheet advertisment entitled "The Earthbound Steel Anchored Platform", Topeka, Kan.

*Primary Examiner*—J. Franklin Foss
*Assistant Examiner*—David L. Talbott
*Attorney, Agent, or Firm*—D. A. N. Chase

[57] ABSTRACT

A foundation system for a mast is installed in the ground with earth anhcors and employs three unitary arms radiating from a central mounting hub. The mast, typically a pipe, is united with the foundation system by a combination clamp and brace which resists high torsion and overturn loading that occurs under high wind conditions. Upper and lower clamping collars are provided by specially configured gusset plates integral with the inner ends of the arms. Each gusset plate on an associated arm has a wing portion welded to the arm and an arcuate portion extending therefrom which partially embraces the mast. An outwardly bent lug on the distal end of each gusset plate is in proximal relationship to the wing of the gusset plate on an adjacent arm, thus the application of drawbolts tightens the plates to form the upper and lower clamping collars and rigidly secure the mast to the system in a vertical orientation.

7 Claims, 6 Drawing Figures

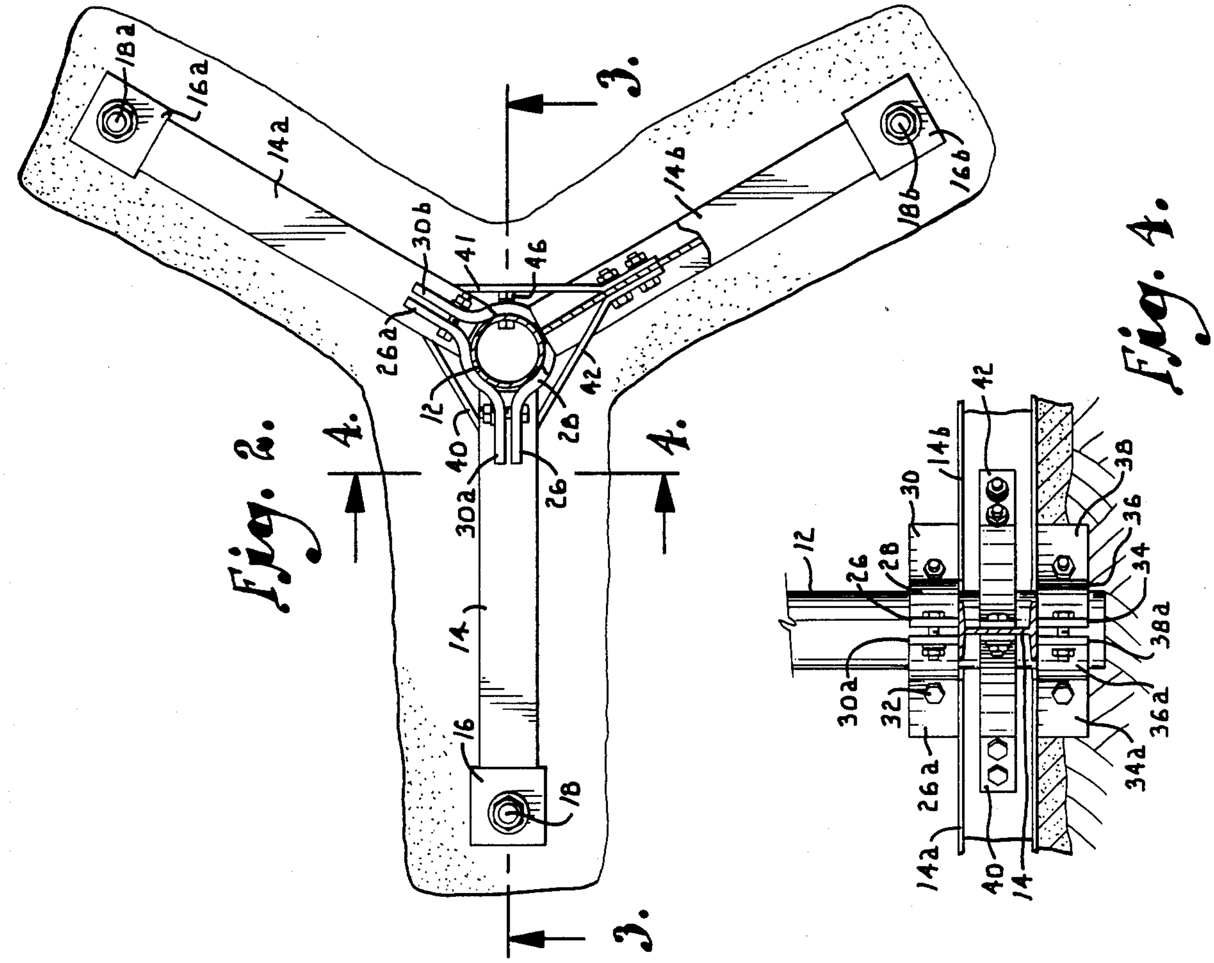
Fig. 2.
Fig. 4.
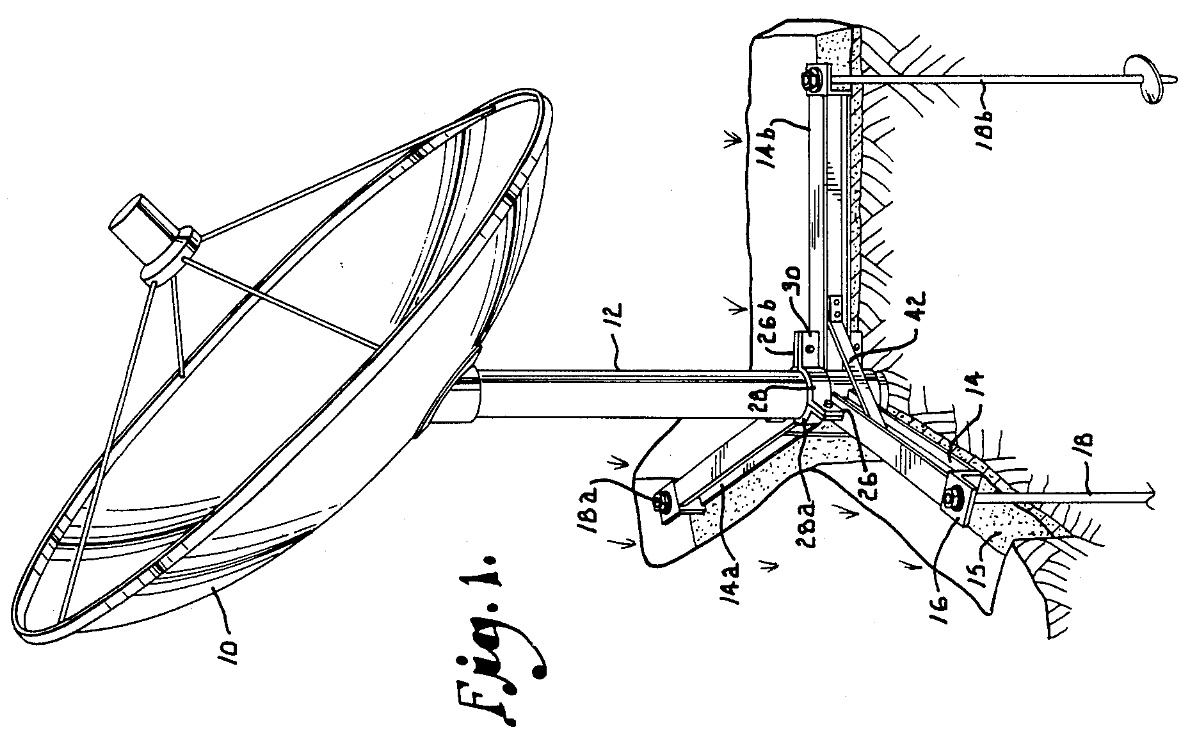
Fig. 1.

FOUNDATION SYSTEM FOR GROUND-MOUNTED MASTS

This application is a continuation-in-part of our application Ser. No. 751,622, filed July 2, 1985, now abandoned.

This invention relates to improvements in anchored foundation systems utilized as an alternative to concrete for mounting antenna masts and other mast or pole structures which must be supported in a true vertical orientation.

Satellite television receiving systems require an antenna that is generally considered to be rather large in size by residential standards. With the availability and growing use of home satellite television systems, the mounting of the receiving antenna (typically a parabolic reflector) creates problems both mechanically and aesthetically. It is desired to provide a simple and relatively inexpensive means of mounting satellite dishes for residential applications which is structurally strong and resistant to the adverse effects of climate and weather and yet facilitates a quick and inexpensive installation.

It is important that simplicity not be achieved at the expense of mechanical integrity. For satisfactory reception, satellite dishes must remain in proper alignment. The supporting mast, typically a pipe, must remain vertical. The mounting system should not require frequent adjustment, but if necessary the support structure should be of a type that can be readjusted without any sacrifice in stability.

Masts for other purposes, such as for supporting basketball goals or which serve as flag poles, present similar requirements. The conventional practice of setting the base of a mast in concrete requires excavation, places climatic and weather limitations on installation, and precludes readjustment.

It is, therefore, the primary object of the present invention to provide an in-ground foundation system that replaces concrete for mounting a mast which is easy to install, mechanically uncomplex, and highly stable in order to react large magnitude overturn moments and torsional loads that are applied to single pole masts resulting from high wind loading on parabolic reflectors used in satellite television systems, outdoor basketball backboards, signboards and the like.

As a corollary to the foregoing object, it is an important aim of this invention to provide a combination clamp and brace having such characteristics and which is capable of rigidly uniting the mast with an underlying mounting foundation system.

Another important object of the invention is to provide an in-ground foundation system for a mast employing a plurality of unitary arms radiating from a central mounting hub, the aforesaid clamp and brace being employed at the hub to rigidly support the mast in the foundation and to resist torsional and overturn loading of the mast.

Still another important object is to provide an in-ground foundation system as recited in the preceding object in which the elements of the clamp and brace are integral with the radiating arms, thereby providing the necessary rigidity and stability and also minimizing the number of components of the mechanical system.

Furthermore, it is an important object of the invention to provide a clamp and brace as aforesaid which provide a gusset effect at the base of the mast where it is united with the foundation system, and yet accomplish this objective with a system that is mechanically uncomplex, may be assembled quickly at the site, and that is readily adaptable to retrofit applications.

Additionally, another important object of this invention is to provide such a clamp and brace that is compatible with foundations installed beneath the surface of the ground and which are structurally stablized by earth anchors rather than concrete in order to facilitate rapid installation, eliminate realignment problems associated with shifting or settling of concrete pads and piers, and facilitate releveling of the system at the points where the arms of the system are connected to the earth anchors. The total weight of such mechanical system is approximately one-tenth the weight of a concrete foundation required to react the same loading conditions.

BRIEF DESCRIPTION OF THE DRAWINGS

FIG. 1 is a perspective view showing the improved foundation system of the present invention as utilized to support a parabolic antenna, the earth being broken away to reveal the system installation and the earth anchors.

FIG. 2 is a horizontal section through the antenna mast in FIG. 1, showing the foundation system in plan; certain parts are broken away on one of the arms to reveal details of construction.

FIG. 4 is a fragmentary, vertical cross-sectional view taken along line 4—4 in FIG. 2.

DETAILED DESCRIPTION

Figure 5:
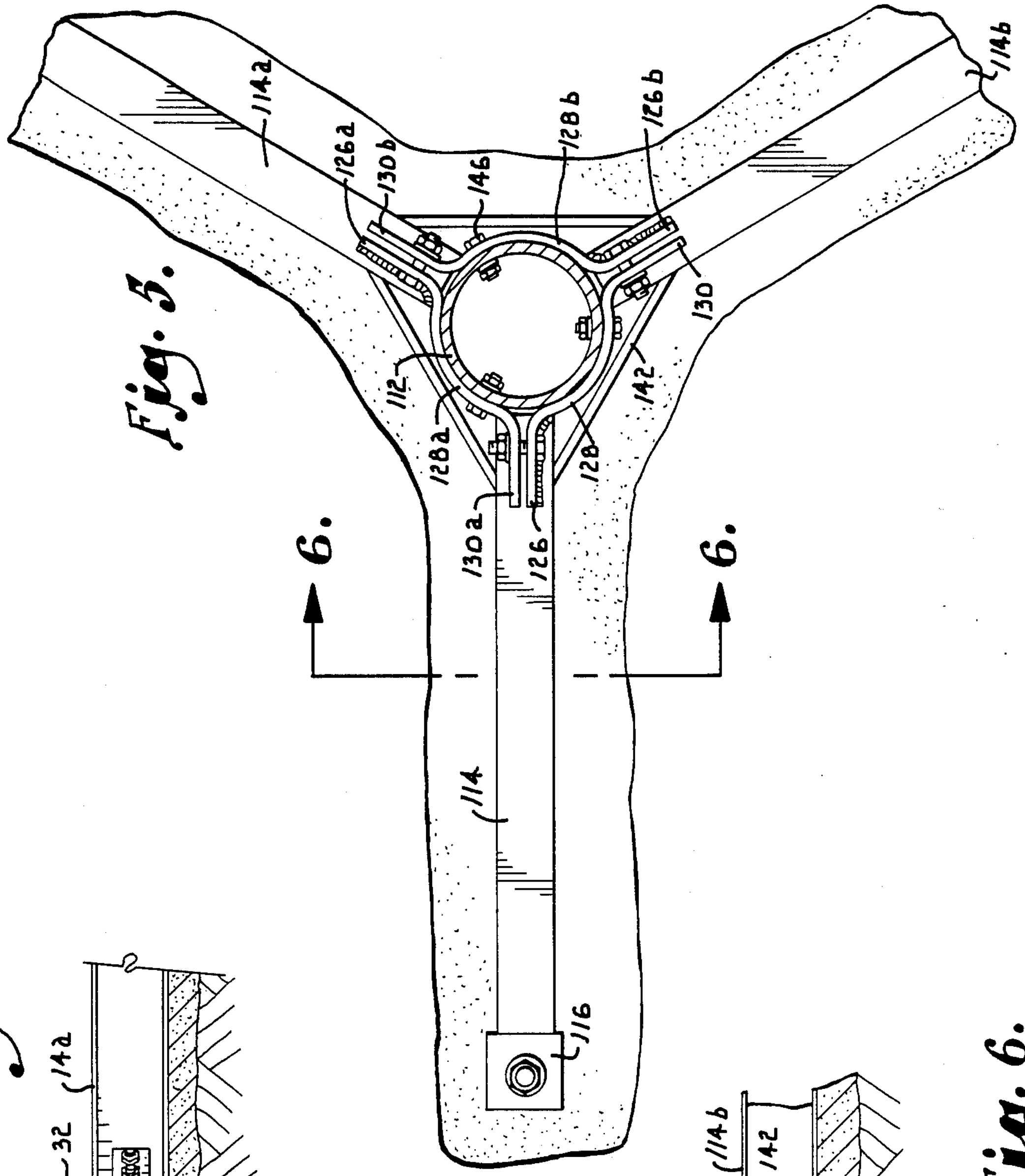
FIG. 5 is a view similar to FIG. 2 but shows a mast of larger diameter in order to illustrate the adaptability of the principles of the present invention to masts of various sizes.

Referring to FIG. 1, a parabolic antenna 10, typically of the type used to receive television signals from a satellite, is shown mounted atop a pipe mast 12. The lower end of the mast 12 is rigidly secured to an anchored foundation structure consisting of three unitary arms 14, 14*a* and 14*b* that radiate from a central mounting hub at which the lower end of the mast 12 is rigidly clamped and braced. It should be noted that the arms 14, 14*a* and 14*b* are installed in the ground just beneath the surface, preferably on a simple bed 15 of sand prepared after shallow troughs are dug. Accordingly, very little excavation is required at the site and the sod may be replaced after installation to conceal the entire system.

As each arm 14, 14*a* or 14*b* and its associated components are of identical construction, only the arm 14 will be described in detail. Corresponding parts associated with the other arms are designated with like reference numerals with the addition of the "a" or "b" notation.

Referring to FIGS. 1–4, the arm 14 is an I-beam provided with an angle iron 16 welded on its outer end, the horizontal flange of the angle iron 16 being apertured to receive the shank of an earth anchor 18. The upper end portion of such shank is threaded, upper and lower nuts 20, 22 and associated washers being installed thereon to permit the foundation structure to be easily leveled. A driver nut 24 is welded to the anchor shank at the bottom of the threaded portion (FIG. 3) to permit the socket end of an anchor driver to be employed to install the earth anchor 18.

An upper gusset plate and a lower gusset plate are welded to the inner end of the arm 14 and, in cooperation with the gusset plates welded on the arms 14*a* and 14*b*, form a clamp assembly for rigidly holding and bracing the mast 12. With respect to the arm 14, referring particularly to FIGS. 2–4, it may be seen that the upper gusset plate is configured to present a wing portion 26 and an arcuate portion 28 which partially embraces the mast 12 and has a radius that mates with the outer surface of the mast. The upper plate is of heavy metal stock and resembles a strap in appearance, the distal end of the plate being bent outwardly to present a lug 30 (FIG. 4) which abuts a corresponding wing 26*b* on arm 14*b* (FIG. 1). As will be appreciated, the three upper gusset plates of the three arms thus comprise the elements of a clamp that, when joined by drawbolts 32, form a collar encircling the mast 12.

The upper surface of the I-beam of arm 14, presented by its upper flange, extends horizontally throughout its length and, in cooperation with the upper flanges of the I-beams of the other arms 14*a* and 14*b*, defines a horizontal plane at which the axis of the pipe mast 12 is secured at a right angle to hold the mast 12 in an exact vertical orientation. The wing 26 of the upper gusset plate is welded to such upper surface of the arm 14 at the lower edge of wing 26. The mast-receiving portion 28, therefore, projects inwardly from the wing portion clear of the inner end of the arm 14 and into clamping relationship with the mast 12. Accordingly, it may be appreciated that the mast 12 is united with the foundation structure formed by the arms 14, 14*a* and 14*b* at a central hub defined by arcuate portions 28, 28*a* and 28*b* of the upper plates and corresponding parts of lower gusset plates to be described hereinafter.

Figure 3:
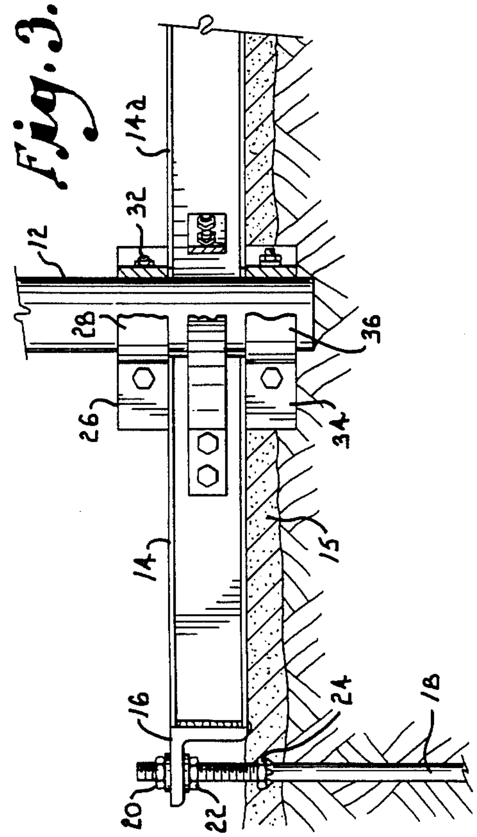
FIG. 3 is a vertical sectional view taken substantially along line 3—3 in FIG. 2, the mast being shown in elevation.

The lower flange of the I-beam of arm 14 likewise presents a horizontally extending lower surface that rests directly on the sand bed 15 as is clear in FIG. 3. A lower gusset plate having the same configuration as the upper plate has a wing portion 34 and an arcuate, mast-receiving portion 36 forming a segment of a lower collar on the mast 12. The upper edge of the wing 34 is welded to the lower surface of the arm 14 adjacent its inner end, the upper wing 26 and the lower wing 34 being located in a common vertical plane as is evident in FIG. 4. The mast-receiving portion 36 terminates in an outwardly bent lug 38 which is proximal to the wing portion 34*b* on arm 14*b*. It may be appreciated, therefore, that when the various bolts 32 are tightened, the upper gusset plates form a rigid collar on the mast 12 at the upper surface of the foundation structure, and the lower gusset plates form a second, rigid collar at the lower surface thereof. The outer lug of one gusset plate being alongside the wing of the adjacent gusset plate permits the bolts 32 to draw the collar segments tightly about the mast 12 in surface-to-surface contact therewith, as may be best appreciated in the plan view of FIG. 2.

Extreme ease of assembly is provided by the configuration of the foundation system of the present invention in that the upper and lower gusset plates of each arm are integral therewith to present a three-piece mounting structure consisting of the three unitary arms 14, 14*a* and 14*b*, except for miscellaneous hardware (such as the drawbolts 32) and the three earth anchors 18, 18*a* and 18*b*. Once assembled, a very rigid clamp and brace are provided which are capable of resisting the high torsion loading that will be applied to the mast 12 under windy conditions. For additional resistance to torsional loads, one or more cross bolts through the mast and gusset plates may be employed, one such cross bolt 46 being shown in FIG. 2. In applications where smaller loads are to be supported, a single, collar-forming clamp may be employed rather than the double clamp provided by the upper and lower gusset plates.

Overturning of the foundation system is reacted by the earth anchors in tension and compression. Torsional loads and side loads are reacted by earth bearing on the radiating arms. This permits the use of thin shaft, screw-type earth anchors for torsionally loaded and side loaded foundations. If tilting of the foundation should occur the ends of the arms may be readily uncovered and the nuts 20 and 22 adjusted to relevel the system.

Under conditions where very high loads are expected, optional braces 40, 41 and 42 may be utilized. The braces bridge the webs of the three arms 14, 14*a* and 14*b* in a triangular arrangement as seen in FIG. 2, and are bolted in place as is clear from the illustrations.

Figure 6:
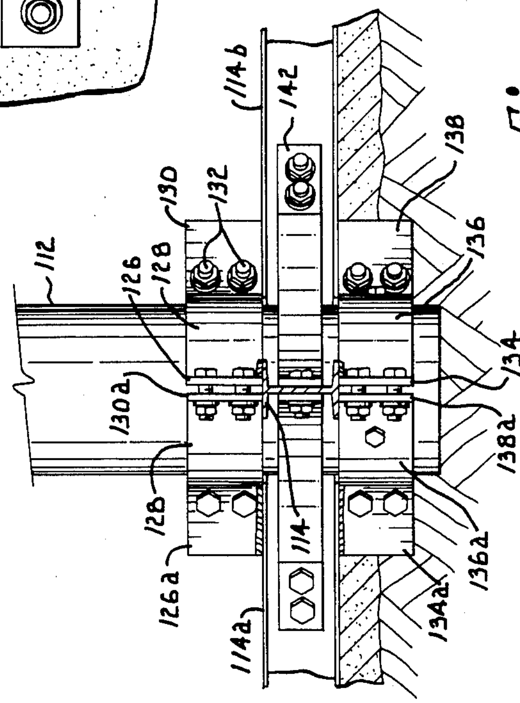
FIG. 6 is a fragmentary, vertical sectional view taken along line 6—6 of FIG. 5.

FIGS. 5 and 6 show a mast 112 of larger diameter and illustrate the manner in which the principles of the present invention are readily applied to masts of various sizes. It may be seen that since the inner ends of the arms are clear of the central mounting hub, the ends cannot interfere with the mounting of the mast regardless of its diameter. The hub is, therefore, open and unobstructed as seen in FIG. 5 and defined solely by the collars formed by the gusset plates. As the construction is the same except for the size of the mast 112, the parts in FIGS. 5 and 6 bear 100-series reference numerals that are otherwise identical to the designations of the parts in FIGS. 1–4.

It should be appreciated that the foundation system as described herein is a completely portable structural foundation that can be left in the ground as a permanent structure or removed and reused in a different location. The equivalent concrete pier structure is approximately ten times the weight of the foundation system of the present invention and is impractical to move and reuse.

The invention is intended to cover all modifications and alternative constructions falling within the spirit and scope of the invention as expressed in the appended claims.

Having thus described the invention, what is claimed as new and desired to be secured by Letters Patent is:

1. In combination, a portable in-ground foundation system mounting a pipe mast comprising:
   - a foundation structure adapted for installation in the ground just below the surface thereof and having a central mounting hub receiving a lower end portion of said mast,
   - said structure comprising a plurality of initially separate, unitary arms each having an inner end at said hub and radiating outwardly therefrom to present an outer end remote from said hub,
   - a plurality of thin shaft, screw-type earth anchors each having a shank secured to and depending from a corresponding arm adjacent the outer end thereof for anchoring the foundation system in the ground,
   - the inner end of each arm being provided with a clamp element integral therewith and partially embracing said mast,
   - said clamp elements on respective arms presenting said mast-receiving hub and each such element including a collar segment conforming to said mast to provide surface-to-surface contact therewith, fastening means releasably joining said clamp elements together and uniting said arms in a manner such that said collar segments circumscribe said lower end portion of the mast to provide a torsion-resistant joint supporting the mast on the arms, and adjustable means connecting said shanks of the anchors to said arms for leveling said structure.

2. In combination, a portable in-ground foundation system mounting a pipe mast comprising:

a foundation structure adapted for installation in the ground just below the surface thereof and having a central mounting hub receiving a lower end portion of said mast, said structure comprising a plurality of initially separate, unitary arms each having an inner end at said hub and radiating outwardly therefrom to present an outer end remote from said hub, a plurality of thin shaft, screw-type earth anchors each having a shank secured to and depending from a corresponding arm adjacent the outer end thereof for anchoring the foundation system in the ground, each of said arms having upper and lower, substantial horizontally extending surfaces and the inner end thereof being provided with upper and lower clamp elements integral therewith, said clamp elements partially embracing said mast and projecting inwardly from corresponding upper and lower surfaces to define said mounting hub, said elements on respective arms presenting a clamp assembly, fastening means releasably joining said clamp elements together and uniting said arms to provide upper and lower collars encircling said lower end portion of the mast adjacent the upper and lower surfaces of the arms, whereby to support the mast on the foundation system to react torsional loading and overturn moments on the mast, and adjustable means connecting said shanks of the anchors to said arms for leveling said structure.

3. The foundation system as claimed in claim 2, wherein the upper and lower clamp elements of each arm are integrally joined therewith at the corresponding upper and lower surfaces of the arm.

4. The foundation system as claimed in claim 2, wherein each of said clamp elements comprises a gusset plate having a wing portion and a portion configured to receive said mast, and wherein the wing portions of the upper and lower clamp elements of each arm are integrally joined therewith at the corresponding upper and lower surfaces of the arm.

5. The foundation system as claimed in claim 4, wherein the wing portion of each upper clamp element is upright and has a lower edge joined with the associated arm at its upper surface, and wherein the wing portion of each lower clamp element extends from the associated arm and has an upper edge joined therewith at its lower surface.

6. The foundation system as claimed in claim 4, wherein said mast-receiving portions of the clamp elements project inwardly from respective wing portions clear of said inner ends of the arms to define said mounting hub.

7. In combination, a portable in-ground foundation system mounting a pipe mast comprising:

a foundation structure adapted for installation in the ground just below the surface thereof and having a central mounting hub receiving a lower end portion of said mast, said structure comprising a plurality of initially separate, unitary arms each having an inner end at said hub and radiating outwardly therefrom to present an outer end remote from said hub, a plurality of thin shaft, screw-type earth anchors each having a shank secured to and depending from a corresponding arm adjacent the outer end thereof for anchoring the foundation system in the ground, each of said arms having a substantially horizontal, radially extending surface and the inner end thereof being provided with a clamp element integral therewith partially embracing said mast and projecting inwardly from said surface of the arm, said elements on respective arms presenting a clamp assembly, the clamp element of each arm comprising an upright gusset plate having a wing portion and a portion configured to receive said mast, said wing portion having a radial edge integrally joined with the associated arm at said surface thereof, said mast-receiving portions of the clamp elements projecting inwardly from respective wing portions clear of said inner ends of the arms to define said mounting hub, fastening means releasably joining said clamp elements together and uniting said arms to provide a collar encircling said lower end portion of the mast adjacent said surfaces of the arms, whereby to support the mast on the foundation system to resist torsion and overturning of the mast, and adjustable means connecting said shanks of the anchors to said arms for leveling said structure.

* * * * *